Feb. 2, 1932.  E. H. REMDE  1,843,735
INDUSTRIAL TRUCK
Original Filed March 22, 1926  3 Sheets-Sheet 1
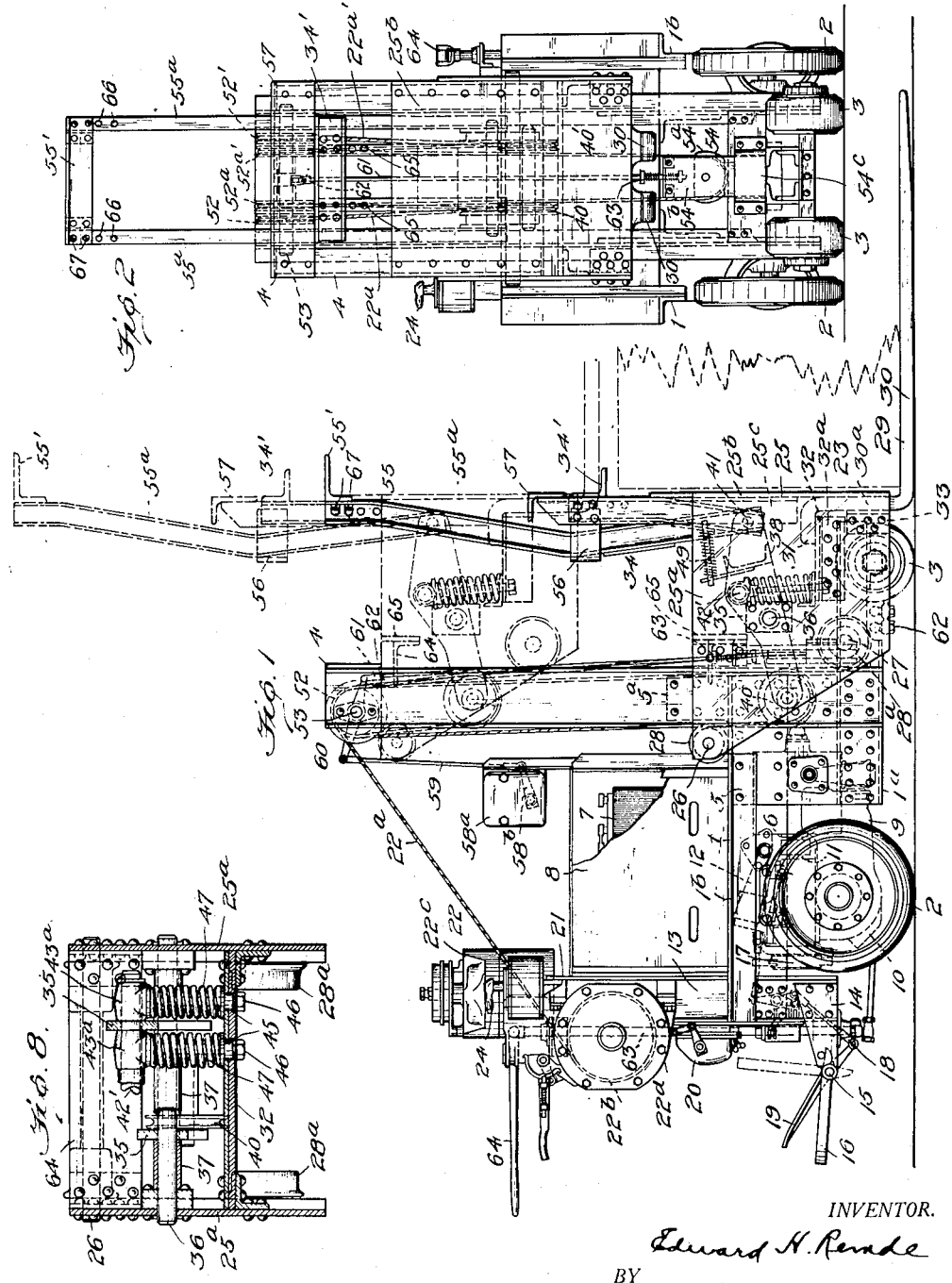
INVENTOR.
Edward H. Remde
BY
Edward R. Alexander
ATTORNEY.

Feb. 2, 1932. E. H. REMDE 1,843,735
INDUSTRIAL TRUCK
Original Filed March 22, 1926   3 Sheets-Sheet 2
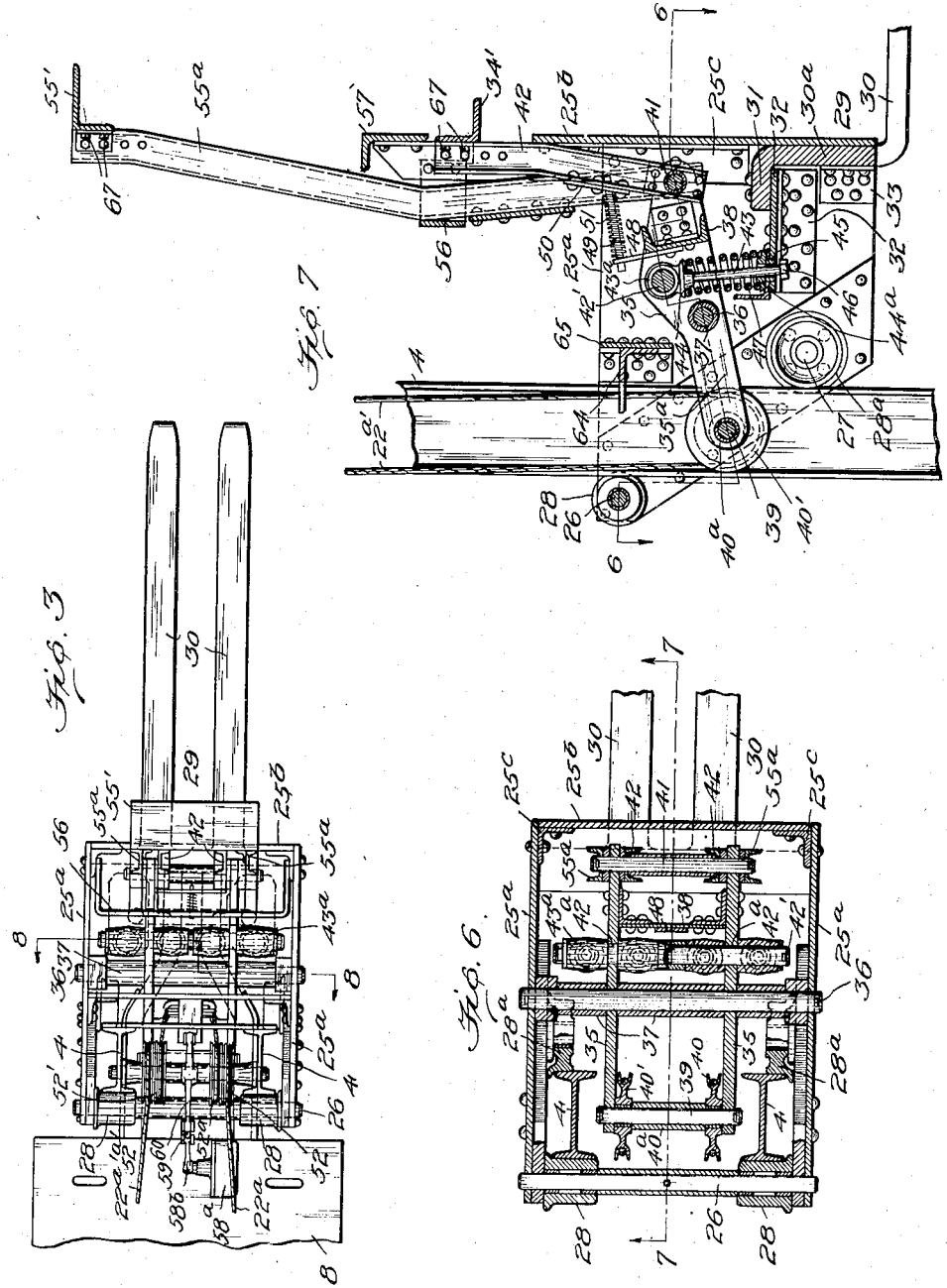
INVENTOR.
Edward H. Remde
BY Edward R. Alexander
ATTORNEY.

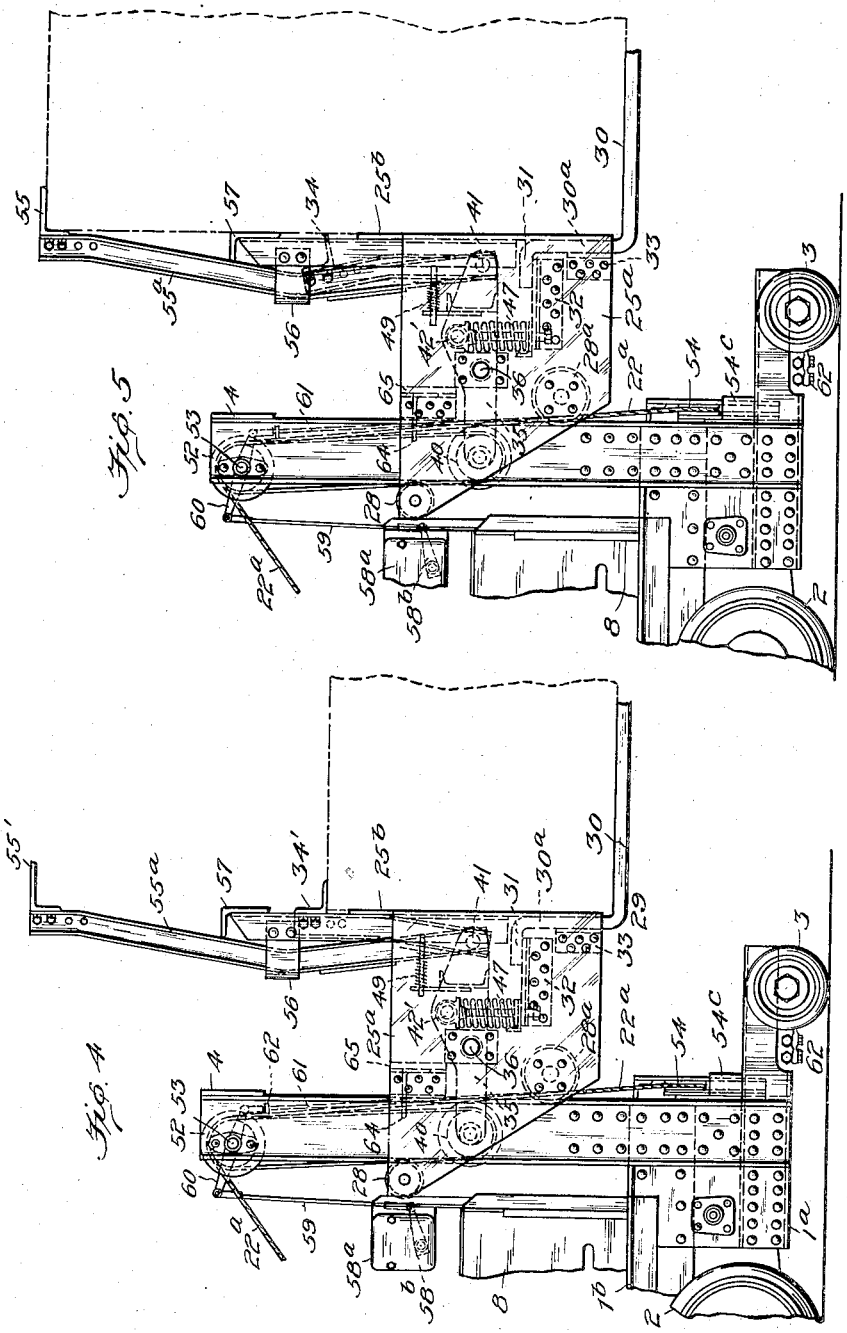

Patented Feb. 2, 1932

1,843,735

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed March 22, 1926, Serial No. 96,550. Renewed March 30, 1931.

This invention relates to an industrial truck capable of readily engaging, elevating or lowering bodies or loads and transporting them from place to place.

One object of the invention is to provide a truck of this character in which the load handling mechanism automatically operates to engage the load when it is elevated and to release the load when the latter is positioned on a support or the floor.

Another object of the invention is to provide a truck of this character in which the load handling mechanism includes a gripping member operatively connected with the elevating mechanism, whereby it is actuated to engage the load when the elevating mechanism operates to raise it.

Another object of the invention is to provide a truck of this character having a plurality of load gripping members, whereby different sized loads may be engaged and handled.

A further object of the invention is to provide a load handling mechanism in which is incorporated a member that is actuated by the hoisting or elevating means to engage the load when such means is operated to raise the load and to disengage the load when the latter is positioned on a support.

Other objects of the invention will be apparent to those skilled in the art to which my invention relates from the following description taken in connection with the accompanying drawings, wherein Fig. 1 is a side elevation of a truck embodying my invention.

Fig. 2 is an end view of the truck looking towards the left of Fig. 1.

Fig. 3 is a fragmentary plan view of the truck.

Fig. 4 is a fragmentary side view of the truck showing a load on the load handling mechanism and the latter elevated.

Fig. 5 is a view similar to Fig. 3, but showing the load handling mechanism carrying a different size load.

Fig. 6 is a section on the line 6—6 of Fig. 7.
Fig. 7 is a section on the line 7—7 of Fig. 6.
Fig. 8 is a section on the line 8—8 of Fig. 3.

In the drawings, 1 indicates a frame of suitable construction supported on pairs of wheels 2, 3, and supporting a guide frame 4. In the illustrated form of construction, the guide frame 4 is disposed between the ends of the frame 1. To provide for the extension of the guide frame 4 downwardly relatively close to the floor or supporting surface, the frame 1 comprises a relatively low section 1a and an elevated horizontal section 1b, which have an overlapping relation and are rigidly connected together preferably by plates 5. The guide frame 4 preferably comprises a pair of vertically disposed I-beams which are riveted to the connecting plates 5 and serve to reinforce them to impart strength and rigidity thereto as well as to insure a rigid relation between the the sections of the frame 1. For this purpose the flanges of the I-beams on their inner lower portions are removed so that the webs of the beams may engage flat against the plates 5, and the latter are provided with extensions 5a which extend upwardly between the flanges (see Fig. 1) and are riveted to the beams, as shown.

Where the truck frame 1 is constructed in the manner shown, the wheels 2 are disposed below the elevated frame section 1b and utilized as traction wheels driven by a motor 6 (preferably of the electric type), while the wheels 3 are relatively small and serve as trailing wheels. 7 indicates the source of power, preferably comprising storage batteries mounted on the elevated frame section 1b and connected by suitable leads with the motor 6. The batteries 7 may be enclosed in a casing 8. The motor 6 is mounted in a cradle 9. The cradle 9 forms a part of the housing 10 for the axle mechanism which drives the traction wheels 2 in a well known manner, the axle mechanism being driven by a propeller shaft 11 connected in a well known manner to the shaft of the motor 6. The axle housing 10 and cradle are connected to the frame 1 by a suitable suspension mechanism 12, which forms the subject-matter of a separate application filed jointly by John H. Hertner and myself—see Letters Patent No. 1,628,145.

13 indicates a pair of vertically extending angle bars secured to the frame section 1b at its outer end and extending thereabove and therebelow. At their lower ends, the bars 13 support a pair of brackets 14 which in turn support a shaft 15 on which is pivoted a base or platform 16 for the operative of the truck to stand on; the base 16 being pivoted on the shaft 15, it may be swung upwardly when not in use as shown in dotted lines in Fig. 1. 17 indicates as an entirety a braking mechanism normally braking the propeller shaft, and through it and the axle mechanism serving to brake the wheels 2. The braking mechanism 17 includes a linkage 18 connected to a foot pedal 19 by which the braking mechanism is controlled. Above the frame section 1b, the bars 13 support a controller 20 for the motor 6 and a dash plate 21, which preferably forms the front wall for the casing 8 and carries a suitable safety switch mechanism which is inter-connected with the braking mechanism 17 to automatically break the motor circuit when the brake is applied.

22 indicates as an entirety a load handling mechanism, which includes a hoisting or elevating means, indicated as an entirety at 23, for raising and lowering the load supporting and engaging elements, whereby the load handling mechanism may operate to elevate and stack loads or bodies to and upon elevated supports and on each other, where stacking or tiering of loads for storing purposes is required, or to remove the loads therefrom. The hoisting means 23 preferably comprise a pair of flexible members 22a, 22a', such as steel cables, connected to the load supporting, elevating and engaging elements in the manner to be later set forth. The cables 22a 22a', wind on and off a pair of drums 22b (only one being shown in Fig. 1) which are driven in either direction by a suitable power means and an electric motor 22c supported by a housing member 22d mounted on the plate 21 and supplied with current from the batteries 7. The mounting for the drums 22b and motor 22c, the driving or power means for the drums, and the braking elements for the drums and motor are fully shown and disclosed in my co-pending application Ser. No. 679,605, filed December 10, 1923. In the illustrated form of construction, I use two cable sections 22a, 22a', and wind both ends on and off the drums 22b simultaneously, for which purpose both drums are driven together in either direction. 24 indicates a controller for the motor 22c, being preferably mounted within easy reach of the operative when standing on the platform 16. 25 indicates a frame preferably of U-shape and comprising side walls 25a and an outer wall 25b, secured to each other by angles 25c. The outer wall 25b is extended upwardly for a purpose to be later set forth. The side walls 25a are formed with pairs of aligned openings, one pair supporting the opposite ends of a shaft 26 and the other pair supporting stud shafts 27, respectively and these shafts loosely carry rollers 28, 28a, which preferably engage the opposite outer end walls of the I-beams constituting the guide frame 4, to slidably support the frame 25 on the latter, whereby it may be raised and lowered by the hoisting or elevating means 23. The frame 25 carries a load supporting member 29 that is adapted to be projected below the load to be elevated or lowered in a well known manner. In the illustrated form of construction this load supporting member comprises a pair of outwardly extending parallel arms 30 disposed substantially horizontally. The inner ends of the arms 30 are connected to a cross plate 30a which is preferably bent upwardly and carries a flange 31 that is secured to a base 32. The base 32 may be supported at its opposite ends by angles 32a secured to the side walls 25a. The cross plate 30a may also be secured by angles 33 to the side walls 25a (see Fig. 7). By reason of the construction just described, the load supporting member 29 may be positioned relatively close to the floor or supporting surface without danger of engagement with the truck frame. 34 indicates as an entirety a load clamping or gripping mechanism arranged to engage the load, preferably on its upper surface, to hold it on the load supporting member 29 while the load handling mechanism is being raised or lowered, or if such mechanism is elevated, while the truck is being driven from one place to another. The clamping or gripping member 34' of the mechanism 34 is correlated with the load supporting member 29 to engage and grip any desired sized load or body, being particularly adapted for handling loads where all are of approximately the same size and shape; for example, boxes, as shown in the drawings; but this member 34' may be shaped to engage and grip loads of a different shape or size, when desired. Of the clamping and gripping mechanism 34, 35 indicates a rocker trunnioned on a shaft 36, which is suitably supported at its opposite ends in the side walls 25a. The rocker 35 may comprise a pair of plates 35a formed with openings through which the shaft 36 extends and held in spaced relation to each other and the side walls of the frame 25 by sleeves 37 and rigidly connected by a channel section 38. At their inner ends, the plates 35a support a shaft 39 on which are loosely mounted rotatable elements 40, 40'. The elements 40, 40', comprise sheaves when the flexible members 22a, 22a', consist of cables, as shown in the drawings. The sheaves 40, 40', are held in spaced relation by a sleeve 40a. The purpose of the sheaves, 40, 40', will later appear. At their outer ends, the plates 35a support a shaft 41 on which is pivoted an arm 42 extending upwardly and carrying at its upper end the clamping or gripping member 34' (already referred to). The arm 42 may comprise a pair of channel bars formed with openings at or near their lower ends to receive the shaft 41 and the gripping member 34' may comprise an angle bar having one flange rigidly secured in a detachable manner to the bars and its other flange extending outwardly to engage the upper surface of the load, as shown in Fig. 4; such angle bar serving to connect the channel bars together so that they may swing on the shaft 41 as a unit. The rocker 35 is normally held in one position, that is, with its inner end down and its outer end up, so that the gripping member 34' will be free of the load when and during the time that the truck is operated to project the supporting member 29 therebelow, then the rocker is operated, as will later be described, to move the gripping member 34' into engagement with the load and to clamp it upon the load supporting member 29. As will later appear, the clamping and gripping mechanism 34 is associated and inter-connected with the hoisting or elevating means 23, so that upon the operation thereof to elevate the frame 25, the load supporting member 29 and the load thereon, the gripping member 34' is moved into engagement with the load and the tension or pull of the hoisting or elevating means is utilized to cause the gripping member 34' to clamp the load on the load supporting member 29. The rocker 35 is preferably normally maintained in the position above referred to by the following instrumentalities: 42' indicates a rod or shaft supported in and extending through aligned openings 42a formed in the rocker plates 35a; 43 indicates a plurality of rods carrying hollow bosses 43a at one end and rotatably fitting the rod 42' and provided with collars 44 adjacent the bosses. The lower ends of the rods 43 extend through openings 45 formed in the base 32, one opening being provided for each rod and the wall of the opening serving as a guide therefor, as the rocker operates in either direction, and permitting the rod to slide as well as swing due to the movement of the rocker 35. The free ends of the rods 43 are screw threaded to support nuts 46, which are adapted to engage the lower face of the base 32 to limit the rocking of the rocker 35 in one direction and movement of the gripping member 34' upwardly. 47 indicate coiled springs, one thereof surrounding each rod 43 and interposed between the collar 44 and a collar 44a surrounding the adjacent opening 45. As will be understood, the springs 47 normally act to rock the rocker in one direction to maintain its outer end in the up position, as shown in Figs. 1 and 7. By preference, the springs 47 are strong enough to maintain the rocker 35 in its normal position even when the frame 25 and member 29, without a load on the latter, are raised and lowered by the raising and lowering means 23, but when the weight on these elements is increased, as when the member 29 engages a load to raise it, the tension of the springs is overcome by the increased resistance to the pull on the cables, and as a result thereof the rocker is actuated by the raising and lowering means 23. By this arrangement and construction it will be seen that the engaging member 29 may be elevated to any position for engaging a load and the gripping member will remain in its normal position, so that the load can be readily engaged and loaded on the supporting member 29. 48 indicates a plate secured to and extending upwardly from the channel section 38. At its upper end the plate 48 slidably and swingably supports one end of a pin 49. The pin 49 extends laterally from the plate and its opposite end slidably and swingably fits an opening in a cross plate 50, which also connects together the channel bars constituting the arm 42. 51 indicates a spring surrounding the pin 49 and interposed between the plates 48 and 50. The purpose of the spring 51 is to normally push the arm 42 outwardly against the extended portion of the wall 25b and to maintain it thereagainst, as the rocker 35 operates, so that such wall may guide the gripping member 34' vertically during movement of the rocker, the pivoting of the arm 42 on the rocker 35 (as already described) permitting of this operation. Suitable means may be provided to prevent either end of the pin 49 from disengaging the adjacent plate.

The cable sections 22a, 22a', are operatively connected to the load supporting and handling elements and the gripping mechanism 34 in the following manner: The section 22a leads over and around a sheave 52 loosely mounted on a shaft 53, which is suitably supported by and extends between the guide beams 4 near their upper ends; from the sheave 52, the cable extends down to and around the sheave 40; from the latter sheave the cable extends upwardly to and around a sheave 52a also loosely mounted on the shaft 53; and from the latter sheave, the cable 22a extends down to and is operatively connected to a slack absorbing or take-up means indicated as an entirety at 54. The section 22a' leads over and around a sheave 52' loosely mounted on the shaft 53; from the sheave 52' the cable extends down to and around the sheave 40'; from the latter sheave the cable extends upwardly to and around a sheave 52a' loosely mounted on the shaft 53; and from this latter sheave the cable 22a' extends down to and is operatively connected to the take-up means 54. The operative connection for the cables 22a, 22a', with the take-up means 54 may comprise a sheave in which arrangement the cables will be formed from a single section, but preferably this connection consists of a rotatable element 54a having grooves around its side edges and suitable means on its lower portion to secure the cable ends thereto. In the arrangement of reeving for the cables 22a, 22a', just described, it will be seen that when the drums 22b are rotated to wind them thereon, in raising a load (assuming that the truck has first been operated to project the supporting member below the load as hereinbefore set forth), the pull of the cables will be transmitted to and through the sheaves 40, 40', and hence this pull will first act to swing or rock the rocket 35 and the latter in turn will move the gripping member 34' into engagement with the load and clamp it on the load supporting member 29, following which the continued pull of the cables will be effective to raise the frame 25, supporting member 29 and the load thereon, while maintaining the gripping member 34' in clamping relation with the latter, as shown in Fig. 4. In lowering these elements to position the load on the floor or on an elevated support, the gripping member 34' remains in clamping engagement with the load until it engages its support, whereupon, the tension or pull of the cables on the rocker being relieved, the springs 47 will rock the rocker 35 to its normal position and thus release the gripping member 34' from the load (see Fig. 1).

From the foregoing description it will be seen that the gripping means is automatic in its operation and is dependent upon the pull of the hoisting members incident to the lifting or lowering of the load and the positioning thereof on a support.

55 indicates as an entirety a supplemental gripping means having a gripping member 55' adapted to engage and grip a load larger in size than that for which the gripping member 34' is arranged to engage and grip. The gripping member 55' is carried by an arm 55a, pivoted on the shaft 41 and extending upwardly therefrom the desired height, dependent upon the size of load to be handled. Preferably, the gripping member 55' is positioned approximately the same distance above the gripping member 34' as the latter is above the supporting member 29. Where the bodies (such as boxes) to be handled are similar in size and shape, this construction permits two thereof to be handled as a single load; or under other conditions, two different sized bodies may be handled, one size being engaged by the members 34' and the other size by the member 55', and under these latter conditions the gripping members 34', 55', will be respectively spaced from the load supporting member 29 the required distances to properly engage and clamp the respective loads and to release the same. The arm 55a is preferably constructed similarly to the arm 42, but is guided in a substantially vertical direction by a pair of cross elements 56, 57, supported by the extended ends of the angles 25c.

By pivotally connecting the arm 55a to the rocker 35, the operation of the hoisting means 23 will operate both the arm 55a and arm 42 together, so that either gripping member 34', 55', may be used according to the size of load to be handled. When the load requires the use of the supplemental gripping member 55', the arm 42 and gripping member 34' carried thereby swing rearwardly (see Fig. 5) so as not to obstruct the proper positioning of the load on the supporting member 29 and in operative relationship to the supplemental gripping member 55'; the spring 51 permitting of this rearward movement and serving to reposition the arm 42 into its operative position.

The take-up means 54 preferably comprises a weighted member 54b on which the rotatable member 54a is mounted (see Fig. 2) and a guide 54c therefor. The weighted member 54b is provided with extended sides which abut the lower edge of the guide to limit its upward movement, due to the pull of the cables in supporting or raising and lowering the frame 25 and the supporting member 29 and any load that may be on the latter; but if slack occurs in the cables, or either thereof, for example, due to the load supporting member 29 engaging an obstruction in its down movement, then the weighted member will slide downwardly in its guide 54c and thus take up such slack occurring in the cables. When the member 29 engages an obstruction under the conditions just set forth and slack occurs in the cables, the relieving of the tension on the latter first will permit the rocker to operate under the influence of the springs 47; so that the rocker will compensate for any slight slack that may occur; but if any further slack occurs, the same will be taken up by the take-up means as already described. No claim is made herein to the take-up means in itself since the same forms the subject-matter of an application filed June 24, 1924, by Amiel G. Hutzley, Ser. No. 722,125.

58 indicates a limiting means for stopping the motor 22c to prevent movement of the frame 25 beyond predetermined positions. Of these means, 58a indicates a suitable switch mechanism interposed in the circuits for the motor 22c and having an operating arm 58b connected by a link 59 to one end of a rocker 60, trunnioned on the shaft 53, this rocker being preferably arranged between the sheaves 52, 52a, and 52', 52a', and thereby serving to space them on the shaft. The opposite end of the rocker 60 has connected to it a rod 61, which is suitably guided at its lower end and carries adjustable collars 62, 63, arranged to be engaged by a lug 64 secured to a cross member 65 which is supported by the side walls 25a (see Fig. 7). The rod 61 may be operatively connected to the weighted member 54b, so that when it slides downwardly it will move the rod 61 and through it operate the switch mechanism 58a to stop the motor relatively quickly.

Either or both pairs of the wheels 2, 3, may be mounted to effect steering of the truck. Preferably, both pairs of wheels are mounted on knuckles and connected by operating connections 62, connected to a column 63, having a handle 64.

65 indicate a series of openings formed in the bars constituting the arm 42 and 66 indicate a series of openings formed in the bars constituting the arm 55a, these openings being adapted to receive bolts 67 which removably secure the members 34', 55', to these arms, respectively. By providing each arm with a series of openings, provision is made for adjusting the adjacent gripping member and securing it to the arm in any desired position, whereby it may be arranged to properly grip the load or adjusted to loads of different sizes. The series of openings may be extended down the arms any desired distance to provide for a long range of adjustment.

It will be understood that the rocker 35 may carry a larger number of arms each having a gripping member to adapt the truck for use under varying conditions.

To those skilled in the art to which my invention relates, many changes in construction and widely differing embodiments and applications thereof will suggest themselves without departing from the spirit and scope of the invention. My disclosures and description herein are purely illustrative and are not intended to be in any sense limiting.

What I claim is:

1. In a power driven truck having a frame, a vertically disposed guide thereon, a load engaging and supporting member movable vertically on said guide, a device movably supported on said member and having an element arranged to engage a load when said member engages therewith to clamp it on said member, and raising and lowering means for said member, said means including a flexible member connected directly to said movable device and operating through it and the load on said member to raise or lower the latter.

2. A power driven truck as claimed in claim 1 in which a spring is interposed between the load engaging and supporting member and the movable device for holding the latter in non-clamping position whereby said member may be raised and lowered without a load without operating said device.

3. In a power driven truck having a wheel mounted frame, the combination of a vertical disposed guide frame on said truck frame, a supporting frame slidably engaging said guide frame, a rocker on said supporting frame and carrying a gripping member, means acting on said rocker to normally maintain said gripping member in an inoperative position, and raising and lowering means operatively connected to said rocker and arranged to actuate it from its normal position to move the gripping member into engagement with a load on said supporting frame and act through said rocker and load to raise and lower said supporting frame.

4. In a power driven truck having a wheel mounted frame, the combination of a vertically disposed guide frame thereon, a supporting frame movable vertically on said guide frame and having a relatively stationary load-engaging member, a clamping member movably mounted on said supporting frame, raising and lowering means operatively connected to said clamping member and acting therethrough to raise and lower said supporting frame, and means normally maintaining said clamping member in one position during the raising and lowering of said supporting frame but permitting the actuation thereof by said raising and lowering means when said load-engaging member carries a load.

5. A power driven truck as claimed in claim 4, in which said clamping member comprises a rocker trunnioned on said supporting frame and a clamping device carried by one end thereof, the raising and lowering means being connected to the opposite end of said rocker.

6. In a power driven truck having a wheel mounted frame, the combination of a guide frame thereon, a member slidably engaging said guide frame and having an element arranged to be projected below a load and to engage the load when said member is elevated, a rocker trunnioned on a horizontal axis on said member, an arm on one end of said rocker and carrying a device movable toward and from said element and arranged to clamp the load thereon, means operatively connected to the opposite end of said rocker and operating through it and the load to raise and lower said member, means acting on said rocker to normally maintain it in position to hold said device out of engagement with the load but permitting said raising and lowering means to actuate said rocker and move said device into clamping engagement with the load when said element engages a load and said first mentioned means is set in operation to raise it.

7. A power driven truck as claimed in claim 6 in which said arm is pivoted on said rocker and means are provided for guiding its free end vertically during movement of said rocker.

8. A power driven truck as claimed in claim 6 in which said arm is pivoted on said rocker to permit it to swing inwardly when a load that extends above the clamping device on said arm is engaged by the load engaging element and yieldable means are provided for normally biasing the arm to swing its free end outwardly to maintain said clamping device in position to engage a load.

9. In a power driven truck having a wheel mounted frame, the combination of a guide frame thereon, a member slidably engaging said guide frame, an element projecting therefrom for supporting a load, a device movably mounted on said slidable member, a clamping device pivoted on one end of said movable device and held thereby in spaced relation to said element and movable substantially vertically to engage a load thereon, the opposite end of said movable device carrying a sheave, and raising and lowering means including a winding device and a flexible member arranged to wind on and off said winding device at its inner end, its outer end having a loop depending from the upper portion of said guide frame and reeving around said sheave, whereby the raising and lowering means acts through said movable device and the load to raise and lower said slidable member.

10. A power driven truck as claimed in claim 9 in which said slidably mounted member is provided with a wall that serves to guide said load clamping device.

11. In apparatus of the class described, the combination of a wheel supported frame, a vertically disposed guide thereon, a support movable vertically on said guide, a member movably mounted on said support, a plurality of load engaging devices independently pivoted on said member and each arranged to engage a load, means normally maintaining said member in one position to hold said devices out of engaging relations with a load, and means for raising and lowering said support, said means having operative connection with said member to move it and effect operation of said devices when said raising and lowering means is operating to raise or lower a load on said support.

12. In a power driven truck having a wheel mounted frame, the combination of a vertically disposed guide frame on said truck frame, a supporting frame slidably engaging said guide frame, a rocker on said supporting frame and carrying a gripping member, means acting on said rocker to normally maintain said gripping member in an inoperative position, reeving elements on one of said frames and said rocker, and raising and lowering means for said supporting frame including a flexible member engaging said reeving elements and arranged to actuate said rocker from its normal position to move the gripping member into engagement with a load on said supporting frame and act through said rocker and load to raise and lower said supporting frame.

13. In a power driven truck having a wheel mounted frame, the combination of a vertically disposed guide frame thereon, a supporting frame movable vertically on said guide frame and having a relatively stationary load engaging member, a clamping member movably mounted on said supporting frame, said member having a plurality of clamping devices of different lengths, raising and lowering means operatively connected to said clamping member and acting therethrough to raise and lower said supporting frame, and means normally maintaining said clamping member in one position during the raising and lowering of said supporting frame but permitting the actuation thereof by said raising and lowering means when said load engaging member carries a load.

14. In a power driven truck having a wheel mounted frame, the combination of a vertically disposed guide frame thereon, a supporting frame movable vertically on said guide frame and having a relatively stationary load engaging member, a clamping member movably mounted on said supporting frame, said member including a plurality of relatively movable clamping devices of different lengths, whereby the device below the one in use may be disposed in an inoperative position, raising and lowering means operatively connected to said clamping member and acting therethrough to raise and lower said supporting frame, and means normally maintaining said clamping member in one position during the raising and lowering of said supporting frame but permitting the actuation thereof by said raising and lowering means when said load engaging member carries a load.

15. In a power driven truck having a wheel mounted frame, the combination of a vertically disposed guide frame thereon, a supporting frame movable vertically on said guide frame and having a relatively stationary load engaging member, a clamping member movably mounted on said supporting frame, said member including a plurality of relatively movable clamping devices arranged one above the other, the lower device being pivoted on said member, yieldable means normally operating to maintain said lower device in operative relation to the load, raising and lowering means operatively connected to said clamping member and acting therethrough to raise and lower said supporting frame, and means normally maintaining said clamping member in one position during the raising and lowering of said supporting frame but permitting the actuation thereof by said raising and lowering means when said load engaging member carries a load.

16. In a power driven truck having a frame, a vertically disposed guide thereon, a load engaging and supporting member movable vertically on said guide, a device movably mounted on said member and provided with a plurality of clamping elements disposed at different distances from the load engaging and supporting member, whereby different sized loads may be loaded and secured on the latter when said member engages a load, and raising and lowering means for said member, said means including a flexible member connected directly to said movable device and operating through it and the load on said member to raise or lower the latter.

17. In a truck construction, the combination of a frame, supporting wheels therefor, a guide on said frame, an elevating member movably mounted on said guide, a rocker trunnioned on said member and carrying at one end a device for engaging a load thereon and carrying at its other end a connecting device, a flexible member operatively connected to said connecting device, and means for operating said flexible member, whereby said elevating member is moved along said guide.

18. In a truck construction, the combination of a frame, supporting wheels therefor, a guide on said frame, a load carrying member mounted for sliding movement on said guide, mechanism arranged to engage and grip or to disengage and release a load on said member, operating means for said engaging mechanism, and means normally tending to maintain said engaging and gripping mechanism in an inoperative position and arranged to prevent said mechanism from being moved into engaging position by the action of said operating means when operating said member without a load, said operating means supporting said member during its sliding movement on said guide.

19. In a truck construction, the combination of a frame, supporting wheels therefor, a guide on said frame, a load carrying member mounted for sliding movement on said guide, mechanism arranged to engage and grip or to disengage and release a load on said member, operating means for said engaging mechanism, and means normally maintaining said mechanism in an inoperative position and arranged to prevent said mechanism from being moved into engaging position by the action of said operating means when operating said member without a load, but said last named means being yieldable when said member supports a load to cause said mechanism to move into engaging position, said operating means supporting said member during its sliding movement on said guide.

20. In a truck construction, the combination of a frame, supporting wheels therefor, a guide on said frame, an elevating member movably mounted on said guide, a rocker trunnioned on said member and carrying at one end a device for engaging a load thereon and carrying at its other end a connecting device, springs for maintaining the rocker in one position during movement of said elevating member but arranged to yield when said member engages a load, a flexible member operatively connected to said connecting device, and means for operating said flexible member, whereby said elevating member is moved along said guide.

21. In a truck construction, the combination of a frame, supporting wheels therefor, a guide on said frame, an elevating member movably mounted on said guide, a rocker trunnioned on said member and carrying at one end a device for engaging a load thereon and carrying at its other end a connecting device, said engaging device being pivotally connected to said rocker, a flexible member operatively connected to said connecting device, and means for operating said flexible member, whereby said elevating member is moved along said guide.

22. In combination with a truck, an upwardly extending trackway supported on the truck, a carriage mounted to traverse the trackway, means for raising the carriage, an L-shaped load engaging member, a portion thereof being adapted to pass beneath the load to lift it, the upper end of the L-shaped member being secured directly to the carriage, the lower end thereof resting against the carriage, and a clamp arm positioned over the load engaging portion of the L-shaped member and pivoted to the carriage, said means acting first on the arm at the end thereof opposite the load engaging end of the arm and beyond the pivot to clamp the load and thereafter through the arm and its pivot to raise the carriage, clamp arm and load engaging member as a unit.

23. In an industrial truck, a main frame, traction wheels disposed at the rear of the frame, a pair of relatively small dirigible wheels disposed at the front of the frame, an upwardly extending guideway mounted on said frame, a carriage adjustable on said guideway, means on the carriage and cooperating means on the guideway to limit the movement of the carriage to a direction parallel to the guideway and substantially in a single plane, a forwardly extending load engaging member adapted to extend beneath a load to lift it, a clamp arm pivotally attached to the carriage and adapted to engage the top of a load to calmp it in place on the load engaging member, and hoisting mechanism arranged to first act on the clamp arm at the end thereof opposite the load engaging end and beyond the pivot to move it toward the load, and thereafter, by a continued movement, to raise the carriage and load engaging member while maintaining the arm clamped against the load.

24. In a truck construction, the combination of a frame, supporting wheels therefor, a guide on said frame, a member mounted for sliding movement on said guide and having a load carrying portion arranged to be projected below a load to lift it, mechanism arranged to engage and grip or to disengage and release a load on said load carrying portion and an operating mechanism for said engaging mechanism, said operating mechanism serving to support said member during its sliding movement on said guide and including means actuated by reason of the weight of the load on said load carrying portion, whereby said first mentioned mechanism engages and grips the load on the said portion when said last mentioned mechanism is operated.

25. A truck construction as claimed in claim 24 in which said engaging and gripping mechanism comprises a rocker trunnioned on said member, said operating mechanism is connected to the inner end of said rocker and the outer end of the rocker carries a device to engage or disengage the load when said operating mechanism is operated.

26. In an industrial truck, in combination, a frame, an upwardly extending guide-way thereon, a load lifting carriage adapted to traverse the guide-way, means supported by the guide-way, and means co-operating with the first named means and supported by the carriage to constrain the carriage to move along the guide-way parallel thereto and in a single plane to determine the general position of the load on the carriage with reference to the frame, a load engaging member on the carriage adapted to extend beneath a load to lift such load, and a clamp arm pivotally connected to the carriage and having one end arranged to overhang and engage the load, there being a cable arranged on the truck and connected to the other end of the arm, whereby the operation of the cable effects the clamping and raising of the load.

In testimony whereof, I have hereunto subscribed my name.

EDWARD H. REMDE.